US009643269B2

(12) United States Patent
Akiyama

(10) Patent No.: US 9,643,269 B2
(45) Date of Patent: May 9, 2017

(54) METHOD OF PRODUCING INJECTION-MOLDING DIE FOR WORM WHEEL, AND METHOD OF PRODUCING WORM WHEEL

(71) Applicant: Koji Akiyama, Kawaguchi (JP)

(72) Inventor: Koji Akiyama, Kawaguchi (JP)

(73) Assignee: ENPLAS CORPORATION, Kawaguchi-Shi, Saitama ( * ) Notice: Subject to any disclaimer, the term of this patent is extended or adjusted under 35 U.S.C. 154(b) by 369 days.

(21) Appl. No.: 14/181,293

(22) Filed: Feb. 14, 2014

(65) Prior Publication Data

US 2014/0202992 A1 Jul. 24, 2014

Related U.S. Application Data

(62) Division of application No. 12/735,677, filed as application No. PCT/JP2009/051805 on Feb. 3, 2009, now abandoned.

(30) Foreign Application Priority Data

Feb. 7, 2008 (JP) .................................. 2008-027886
Jan. 30, 2009 (JP) .................................. 2009-019478

(51) Int. Cl.
*B23H 1/04* (2006.01)
*B22D 17/22* (2006.01)
(Continued)

(52) U.S. Cl.
CPC ........... *B23H 1/04* (2013.01); *B22D 17/2245* (2013.01); *B23H 9/00* (2013.01); *B23H 9/003* (2013.01);
(Continued)

(58) Field of Classification Search
CPC .................................. B23H 1/04; B29C 45/37
See application file for complete search history.

(56) References Cited

U.S. PATENT DOCUMENTS 2,802,372 A 8/1957 Hatch
2,821,668 A 1/1958 Bascum
(Continued)

FOREIGN PATENT DOCUMENTS

| JP | H09-250604 A | 9/1997 |
|---|---|---|
| JP | H11-286032 A | 10/1999 |
| JP | 2003-48236 A | 2/2003 |
| JP | 2003-334724 A | 11/2003 |
| JP | 2004-223813 A | 8/2004 |
| JP | 2006-336814 A | 12/2006 |

*Primary Examiner* — James Sanders
(74) *Attorney, Agent, or Firm* — Norton Rose Fulbright US LLP

(57) ABSTRACT

A worm wheel is provided in which a step is not formed near a tooth face meshing with a worm, and noise does not easily occur during power transmission.
A worm wheel 1 includes a circular arc-shaped tooth section 5 that is a portion meshing with a worm 101 and configuring a circular tube worm gear, and a helical tooth section 4 that is connected to one end side of the circular arc-shaped tooth section 5. An angle of torsion at an arbitrary reference point 14 in a tooth depth direction of a tooth 3 on a boundary 7 between the circular arc-shaped tooth section 5 and the helical tooth section 4 is equal to an angle of torsion at a second reference point 15 corresponding to the first reference point 14 in the tooth depth direction of the tooth 3 in a diameter portion P0 of a throat of the circular arc-shaped section 5. As a result, a step is not formed on a tooth face on the boundary 7 between the circular arc-shaped tooth section 5 and the helical tooth section 4. A tooth face of the circular arc-shaped tooth section 5 and a tooth face of the helical tooth section 4 are smoothly connected.

2 Claims, 21 Drawing Sheets

(51) Int. Cl.
  *B23H 9/00* (2006.01)
  *B29C 45/26* (2006.01)
  *B29C 45/37* (2006.01)
  *F16H 55/08* (2006.01)
  *F16H 55/22* (2006.01)
  *B29L 15/00* (2006.01)
  *F16H 1/16* (2006.01)
  *F16H 55/06* (2006.01)

(52) U.S. Cl.
  CPC .......... *B29C 45/2618* (2013.01); *B29C 45/37* (2013.01); *F16H 55/0853* (2013.01); *F16H 55/22* (2013.01); *B29L 2015/003* (2013.01); *F16H 1/16* (2013.01); *F16H 2055/065* (2013.01); *Y10T 74/19953* (2015.01)

(56) References Cited

U.S. PATENT DOCUMENTS

| | | | |
|---|---|---|---|
| 2,821,865 A | | 2/1958 | Ufert |
| 6,204,466 B1* | | 3/2001 | Tabor ................ B23H 1/04 |
| | | | 219/69.17 |
| 7,614,779 B2 | | 11/2009 | Ta et al. |
| 2005/0269478 A1 | | 12/2005 | Woehrle et al. |
| 2006/0261517 A1* | | 11/2006 | Ojima ................ B23H 9/003 |
| | | | 264/261 |

* cited by examiner

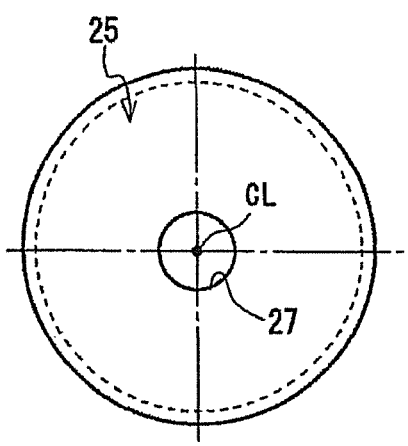
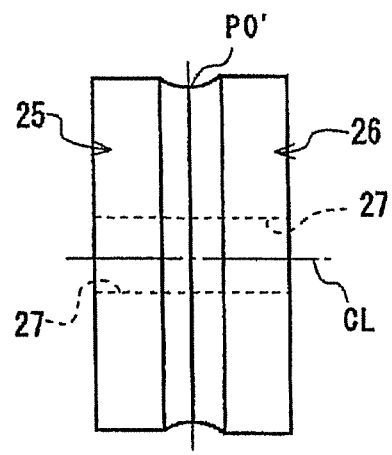
FIG.6A  FIG.6B
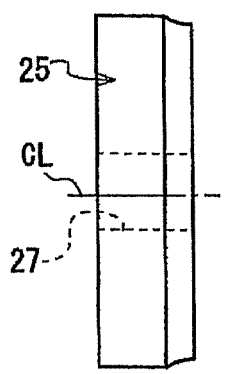
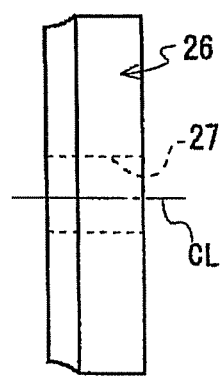
FIG.6C  FIG.6D

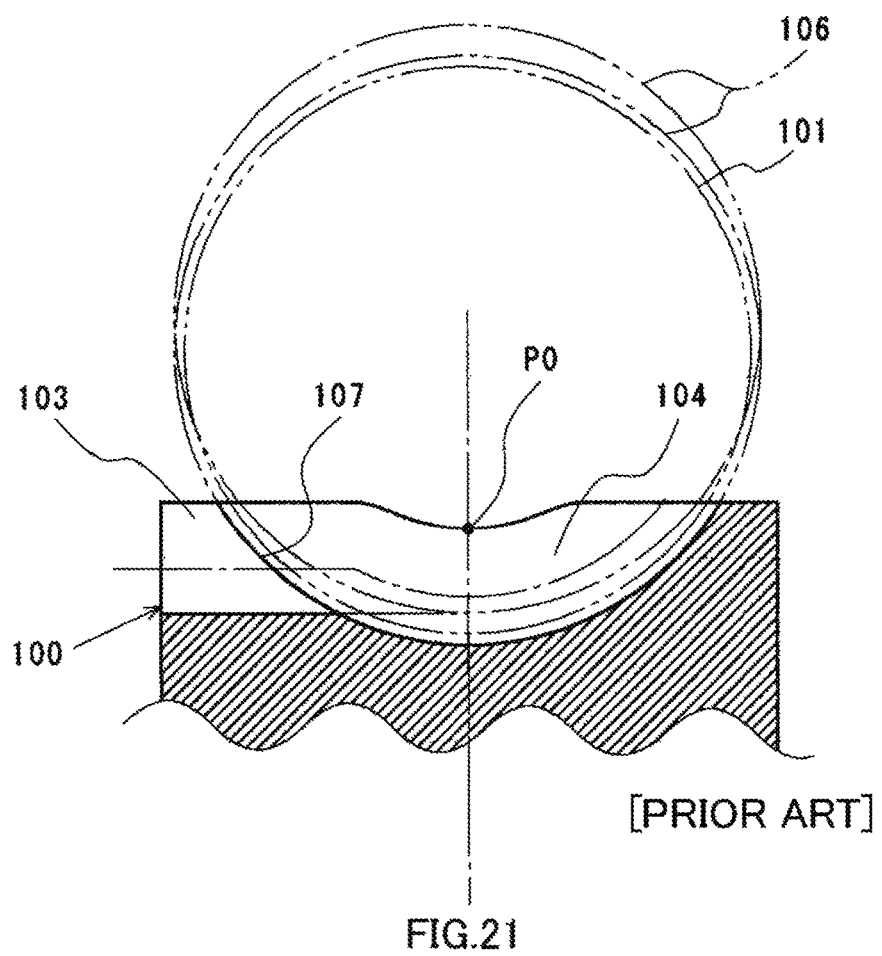
FIG.21 [PRIOR ART]

METHOD OF PRODUCING INJECTION-MOLDING DIE FOR WORM WHEEL, AND METHOD OF PRODUCING WORM WHEEL

TECHNICAL FIELD

The present invention relates to a worm wheel that is used in various power transmission systems and meshes with a worm to configure a worm gear, a method of producing an injection-molding die for the worm wheel, and a method of producing the worm wheel.

BACKGROUND ART

Conventionally, a worm gear is often used to configure a portion of a gear train of a reduction gear in a power transmission system, such as an automobile component.

FIG. 20 shows a worm gear 102 such as that described above. The worm gear 102 is configured by a worm 101 and a worm wheel 100 that meshes with the worm 101. A circular arc-shaped tooth section (half-worm tooth form section) 104 is formed on the outer peripheral side of the worm wheel 100, shaped such that one end side of a helical tooth section 103 is cut into a semi-circular arc shape. In addition, a ring-shaped thick section 105 that does not form teeth is formed on the outer peripheral side of the worm wheel 100. As a result, the strength of the circular arc-shaped tooth section 104 is increased to be capable of bearing load transmitted from the worm 101. The worm 100 is designed to smoothly mesh with the worm 101 (refer to Patent Literature 1).

Patent Literature 1: Japanese Patent Laid-open Publication No. Heisei 9-250604

DISCLOSURE OF INVENTION

Problem to be Solved by the Invention

In the worm wheel 100 such as that shown in FIG. 20, when a length over which the worm wheel 100 meshes with the worm 101 is required to be increased, as shown in FIG. 21, the circular arc-shaped tooth section 104 is displaced further toward a radially inward direction than the helical tooth section 103. Hobbing is performed to reduce the diameter of a diameter portion P0 of the throat.

However, in the worm wheel 100 such as that shown in FIG. 21, a hob 106 moves in the radially inward direction when the circular arc-shaped tooth section 104 is formed. Therefore, the tooth tip of the hob 106 cuts into the tooth face, forming a step 107 on the tooth face of a connecting section between the helical tooth section 103 and the circular arc-shaped tooth section 104 (near the tooth face meshing with the worm 101). When power transmission is performed by the worm wheel 100, having the step 107 on the tooth face of the connecting section between the helical tooth section 103 and the circular arc-shaped tooth section 104 in this way, and the worm 101 being meshed, the tooth tip of the worm 101 may grind against a portion of the step 107 on the tooth face of the worm wheel 100, causing noise.

Therefore, an object of the present invention is to provide a worm wheel in which a step is not formed near a tooth face meshing with a worm and noise during power transmission does not easily occur, a method of producing an injection-molding die for the worm wheel, and a method of producing the worm wheel.

Means for Solving Problem

A first aspect of the invention relates to a worm wheel having a circular arc-shaped tooth section that is a portion meshing with a worm and configuring a circular tube worm gear and a helical tooth section that is connected to one end side of the circular arc-shaped tooth section. In the worm wheel of the invention, an angle of torsion of an arbitrary first reference point in a tooth depth direction of a tooth in a connecting section between the circular arc-shaped tooth section and the helical tooth section is equal to an angle of torsion of a second reference point corresponding to the first reference point in the tooth depth direction of the tooth in a diameter portion of a throat of the circular arc-shaped tooth section.

A second aspect of the invention relates to a worm wheel having a circular arc-shaped tooth section that is a portion meshing with a worm and configuring a circular tube worm gear and helical tooth sections that are respectively connected to both end sides of the circular arc-shaped tooth section. In the worm wheel of the invention, an angle of torsion of an arbitrary first reference point in a tooth depth direction of a tooth in a connecting section between the circular arc-shaped tooth section and the helical tooth section is equal to an angle of torsion of a second reference point corresponding to the first reference point in the tooth depth direction of the tooth in a diameter portion of a throat of the circular arc-shaped tooth section.

A third aspect of the invention relates to a method of producing an injection-molding die for a worm wheel in which a master electrode having a shape similar to the worm wheel is formed and a cavity for injection-molding the worm wheel is formed using the master electrode. In the invention, the worm wheel (1) has a circular arc-shaped tooth section that is a portion meshing with a worm and configuring a circular tube worm gear and a helical tooth section that is connected to one end side of the circular arc-shaped tooth section, and (2) has an angle of torsion at an arbitrary first reference point in a tooth depth direction of a tooth in a connecting section between the circular arc-shaped tooth section and the helical tooth section equal to an angle of torsion at a second reference point corresponding to the first reference point in the tooth depth direction of the tooth in a diameter portion of a throat of the circular arc-shaped tooth section. The master electrode (1) has a first tooth section corresponding to the circular arc-shaped tooth section of the worm wheel and a second tooth section corresponding to the helical tooth section of the worm wheel, (2) has an angle of torsion at a position corresponding to the first reference point in the tooth depth direction of the tooth in a connecting section between the first tooth section and the second tooth section equal to an angle of torsion at a position corresponding to the first reference point in the tooth depth direction of the tooth at a position corresponding to the diameter portion of the throat of the first tooth section, (3) is divided at a position corresponding to the diameter portion of the throat of the first tooth section into a first divided master including a portion of the first tooth section and the second tooth section, and a second divided master including the other portion of the first tooth section, in which (4) the first divided master moves led by the first tooth section, while rotating with a lead of the first tooth section, and electrical-discharge-machines a die material from one side of the die material and (5) the second divided master moves led by the first tooth section, while rotating with a lead of the first tooth section, and electrical-discharge-machines a die material from the other side of the die material, and (6) forms the cavity in the die material. The present invention includes an aspect in which one of either the first divided master or the second divided master starts electrical discharge machining first, and an aspect in which the first divided master and the second divided master simultaneously start electrical discharge machining.

A fourth aspect of the invention relates to a method of producing an injection-molding die for a worm wheel in which a master electrode having a shape similar to the worm wheel is formed and a cavity for injection-molding the worm wheel is formed using the master electrode. In the invention, the worm wheel (1) has a circular arc-shaped tooth section that is a portion meshing with a worm and configuring a circular tube worm gear and helical tooth sections that are respectively connected to both end sides of the circular arc-shaped tooth section, and (2) has an angle of torsion at an arbitrary first reference point in a tooth depth direction of a tooth in a connecting section between the circular arc-shaped tooth section and the helical tooth section equal to an angle of torsion at a second reference point corresponding to the first reference point in the tooth depth direction of the tooth in a diameter portion of a throat of the circular arc-shaped tooth section. The master electrode (1) has a first tooth section corresponding to the circular arc-shaped tooth section of the worm wheel and a second tooth section corresponding to the helical tooth section of the worm wheel, (2) has an angle of torsion at a position corresponding to the first reference point in the tooth depth direction of the tooth in a connecting section between the first tooth section and the second tooth section equal to an angle of torsion at a position corresponding to the first reference point in the tooth depth direction of the tooth at a position corresponding to the diameter portion of the throat of the first tooth section, (3) is divided at a position corresponding to the diameter portion of the throat of the first tooth section into a first divided master including a portion of the first tooth section and the second tooth section, and a second divided master including the other portion of the first tooth section and the second tooth section, in which (4) the first divided master moves led by the first tooth section, while rotating with a lead of the first tooth section, and electrical-discharge-machines a die material from one side of the die material and (5) the second divided master moves led by the first tooth section, while rotating with a lead of the first tooth section, and electrical-discharge-machines a die material from the other side of the die material, and (6) forms the cavity in the die material. The present invention includes an aspect in which one of either the first divided master or the second divided master starts electrical discharge machining first, and an aspect in which the first divided master and the second divided master simultaneously start electrical discharge machining.

A fifth aspect of the invention relates to a method of producing an injection-molding die for a worm wheel in which a master electrode having a shape similar to the worm wheel is formed and a cavity for injection-molding the worm wheel is formed using the master electrode. In the invention, the worm wheel (1) has a circular arc-shaped tooth section that is a portion meshing with a worm and configuring a circular tube worm gear and a helical tooth section that is connected to one end side of the circular arc-shaped tooth section, and (2) has an angle of torsion at an arbitrary first reference point in a tooth depth direction of a tooth in a connecting section between the circular arc-shaped tooth section and the helical tooth section equal to an angle of torsion at a second reference point corresponding to the first reference point in the tooth depth direction of the tooth in a diameter portion of a throat of the circular arc-shaped tooth section. The master electrode (1) has a first tooth section corresponding to the circular arc-shaped tooth section of the worm wheel and a second tooth section corresponding to the helical tooth section of the worm wheel, and (2) has an angle of torsion at a position corresponding to the first reference point in the tooth depth direction of the tooth in a connecting section between the first tooth section and the second tooth section equal to an angle of torsion at a position corresponding to the first reference point in the tooth depth direction of the tooth at a position corresponding to the diameter portion of the throat of the first tooth section. In the present invention, the cavity is formed by electrocasting using the master electrode.

A sixth aspect of the invention relates to a method of producing an injection-molding die for a worm wheel in which a master electrode having a shape similar to the worm wheel is formed and a cavity for injection-molding the worm wheel is formed using the master electrode. In the invention, the worm wheel (1) has a circular arc-shaped tooth section that is a portion meshing with a worm and configuring a circular tube worm gear and helical tooth sections that are respectively connected to both end sides of the circular arc-shaped tooth section, and (2) has an angle of torsion at an arbitrary first reference point in a tooth depth direction of a tooth in a connecting section between the circular arc-shaped tooth section and the helical tooth section equal to an angle of torsion at a second reference point corresponding to the first reference point in the tooth depth direction of the tooth in a diameter portion of a throat of the circular arc-shaped tooth section. The master electrode (1) has a first tooth section corresponding to the circular arc-shaped tooth section of the worm wheel and a second tooth section corresponding to the helical tooth section of the worm wheel, and (2) has an angle of torsion at a position corresponding to the first reference point in the tooth depth direction of the tooth in a connecting section between the first tooth section and the second tooth section equal to an angle of torsion at a position corresponding to the first reference point in the tooth depth direction of the tooth at a position corresponding to the diameter portion of the throat of the first tooth section. In the present invention, the cavity is formed by electrocasting using the master electrode.

A seventh aspect of the invention relates to a method of producing a worm wheel, in which an injection-molding die for a worm wheel formed by a method of producing an injection-molding die for a worm wheel according to the third aspect or the fifth aspect is used to injection-mold a worm wheel according to the first aspect.

An eighth aspect of the invention relates to a method of producing a worm wheel, in which an injection-molding die for a worm wheel formed by a method of producing an injection-molding die for a worm wheel according to the fourth aspect or the sixth aspect is used to injection-mold a worm wheel according to the second aspect.

Effect of the Invention

In the present invention, a step is not formed on a tooth face of a connecting section between a circular arc-shaped tooth section and a helical tooth section. The tooth face of the circular arc-shaped tooth section and the tooth face of the helical tooth section are smoothly connected. Therefore, noise occurring when power transmission is performed by a worm wheel meshing with a worm can be reduced.

BRIEF DESCRIPTION OF DRAWINGS

FIG. 1 is a diagram of a worm wheel according to a first embodiment of the present invention, in which FIG. 1A is a front view, FIG. 1B is a cross-sectional view taken along line A1-A1 in FIG. 1A, and FIG. 1C is a view from an arrow B1 direction in FIG. 1B (rear view);

FIG. 4 is a diagram of a master electrode according to the first embodiment of the present invention, in which FIG. 4A is a front view of the master electrode (the master electrode in FIG. 4B viewed from an arrow B3 direction), FIG. 4B is a cross-sectional view taken along line A2-A2 in FIG. 4A, and FIG. 4C is a rear view of the master electrode (the master electrode shown in FIG. 4B viewed from an arrow B2 direction);

FIG. 6 is a diagram of a first electrode material for a first divided master configuring the master electrode in FIG. 4 and a second electrode material for a second divided master configuring the master electrode in FIG. 4, in which FIG. 6A is a front view, FIG. 6B is a side view showing the first electrode material and the second electrode material in combination, FIG. 6C is a side view of the first electrode material, and FIG. 6D is a side view of the second electrode material;

FIG. 14 is a diagram of a worm wheel according to a second embodiment of the present invention, in which

FIG. 21 is an enlarged cross-sectional view of a worm wheel in a second conventional example.

BEST MODE(S) FOR CARRYING OUT THE INVENTION

Embodiments of the present invention will be described in detail with reference to the drawings.

[First Embodiment]

(Worm Wheel)

Figure 1:
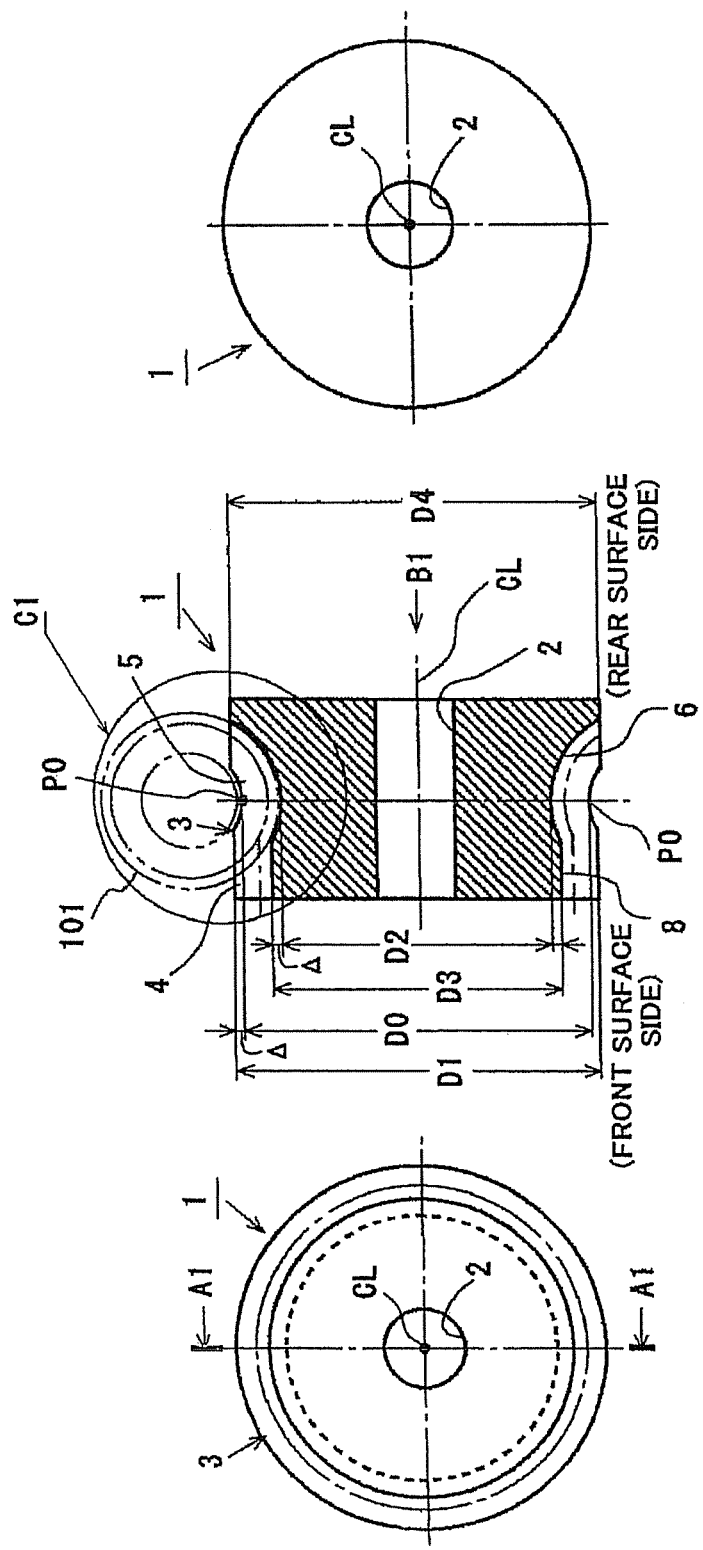
Figure 2:
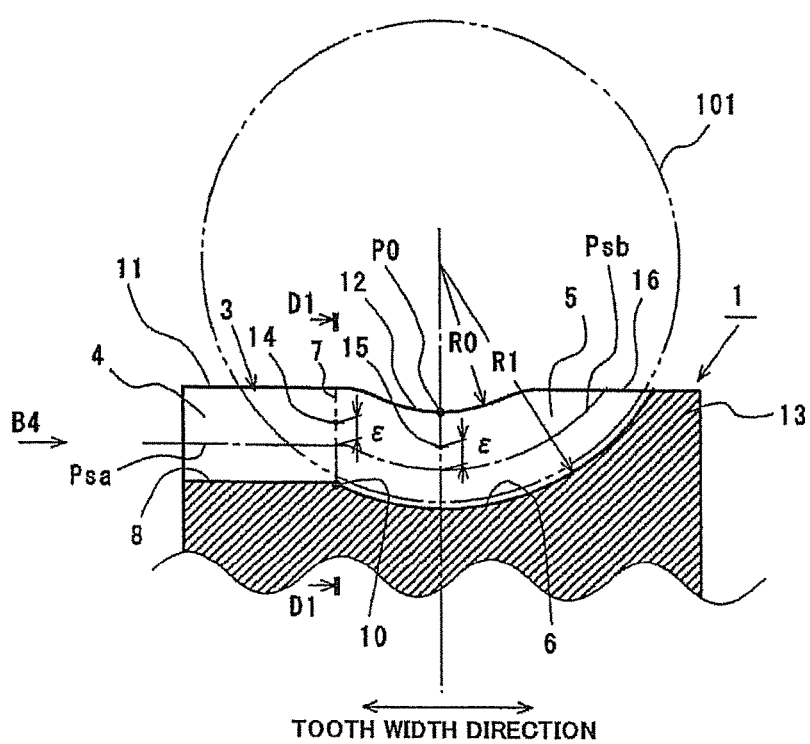
FIG. 2 is an enlarged view of section C1 in FIG. 1B.
Figure 3:
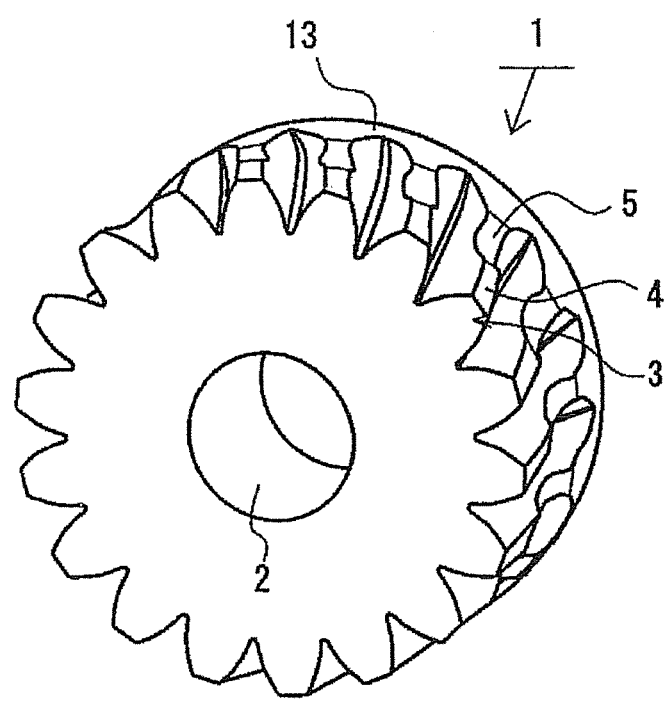
FIG. 3 is an outer perspective view of the worm wheel according to the first embodiment of the present invention.

FIG. 1 to FIG. 3 show a worm wheel 1 according to a first embodiment. Among these drawings, FIG. 1A is a front view of the worm wheel 1. FIG. 1B is a cross-sectional view taken along line A1-A1 in FIG. 1A. FIG. 1C is a view from an arrow B1 direction in FIG. 1B (rear view). FIG. 2 is an enlarged view of section C1 in FIG. 1B. FIG. 3 is an outer perspective view of the worm wheel 1.

As shown in the drawings, in the worm wheel 1 according to the first embodiment, a shaft hole 2 is formed in a rotational center portion, and a plurality of teeth 3 are formed on an outer peripheral side. The shaft hole 2 passes through the worm wheel 1 from a front surface side to a rear surface side, along a direction in which a rotational axis center CL extends.

The tooth 3 is configured by a helical tooth section 4 and a circular arc-shaped tooth section 5. The helical tooth section 4 and the circular arc-shaped tooth section 5 are smoothly connected along a tooth width direction. A diameter (D0) of a throat of the circular arc-shaped tooth section 5 is smaller than a tooth tip diameter (D1) of the helical tooth section 4 by a predetermined length ($\Delta$). A diameter (D2) of a tooth bottom 6 in a diameter portion P0 of the throat of the circular arc-shaped tooth section 5 is smaller than a tooth bottom diameter (D3) of the helical tooth section 4 by the predetermined length ($\Delta$). The tooth tip 12 of the circular arc-shaped tooth section 5 is formed having a radius of curvature R0 of the throat determined in correspondence with a pitch circle of the meshing worm 101. The tooth bottom 6 of the circular arc-shaped tooth section 5 is formed having a tooth bottom radius R1 of the throat determined in correspondence with the pitch circle of the meshing worm 101. The circular arc-shaped tooth section 5 of the worm wheel 1 is a portion meshing with the worm 101 and configuring a circular tube worm gear. The shape of the tooth forms shown in FIG. 1B and FIG. 2 forms a circular arc shape that is convex in a radially inward direction.

In this way, as a result of the diameter (D0) of the throat of the circular arc-shaped tooth section 5 being smaller than the tooth tip diameter (D1) of the helical tooth section 4, compared to a conventional worm wheel 100 in which the diameter (D0) of the throat of the circular arc-shaped tooth section 5 and the tooth tip diameter (D1) of the helical tooth section 4 are equal, the length over which the worm wheel 1 meshes with the worm 101 can be increased.

As shown in FIG. 2, in the tooth 3 of the worm wheel 1, a boundary (connecting section) 7 between the helical tooth section 4 and the circular arc-shaped tooth section 5 is a portion indicated by an imaginary line extending in a tooth depth direction from a merging position 10 between the tooth bottom 6 of the circular arc-shaped tooth section 5 and the tooth bottom 8 of the helical tooth section 4. The tooth 3 of the worm wheel 1 is formed such that an angle of torsion of the tooth tip 11 on at least the boundary 7 of the helical tooth section 4 and an angle of torsion of the tooth tip 12 in the diameter portion P0 of the throat of the circular arc-shaped tooth section 5 are equal. According to the first embodiment, the helical tooth section 4 is formed such that the angle of torsion of the tooth tip 11 of the helical tooth section 4 is equal over almost all areas in the tooth width direction of the helical tooth section 4. The diameter portion P0 of the throat is a portion having the smallest diameter in the tooth tip 12 of the circular arc-shaped tooth section 5 in FIG. 1B and FIG. 2.

As a result, in the worm wheel 1, the boundary 7 (connecting section) between the helical tooth section 4 and the circular arc-shaped tooth section 5 of the tooth 3 is smoothly connected, and a step is not formed on the tooth face on the boundary 7 between the helical tooth section 4 and the circular arc-shaped tooth section 5. Therefore, when power transmission is performed by the worm wheel 1 meshing with the worm 101, a problem such as the tooth tip of the worm wheel 101 interfering with the step on the tooth face as a result of variation in inter-axial distance between the worm wheel 1 and the worm 101 and variation in tooth form accuracy can be prevented. Noise caused by grinding sounds between the worm wheel 1 and the worm 101 can be kept to a minimum.

In the worm wheel 1, a flange section 13 that does not mesh with the worm 101 is formed as a result of the circular arc-shaped tooth section 5 being cut at a roughly center portion in the tooth width direction. The strength of the teeth of the circular arc-shaped tooth section 5 is enhanced.

The worm wheel 1 according to the first embodiment is formed such that the tooth tip diameter D1 of the helical tooth section 4 and an outer diameter dimension D4 of an outer peripheral surface 13a on the flange section 13 side are equal. The tooth tip 12 of the circular arc-shaped tooth section 5 and the tooth tip 11 of the helical tooth section 4 are connected by a smooth curved surface. The tooth tip 12 of the circular arc-shaped tooth section 5 and an outer peripheral surface 16 on the flange section 13 side are connected by a smooth curved surface.

In the worm wheel 1 according to the first embodiment configured as described above, a step is not formed on the tooth face on the boundary 7 between the helical tooth section 4 and the circular arc-shaped tooth section 5. The tooth face of the helical tooth section 4 and the tooth face of the circular arc-shaped tooth section 5 of the tooth 3 are smoothly connected to each other. Therefore, noise generated when power transmission is performed by the worm wheel 1 and the worm 101 being meshed can be reduced.

The worm wheel 1 according to the first embodiment is configured such that the angle of torsion of the tooth tip 11 on the boundary 7 of the helical tooth section 4 and the angle of torsion of the tooth tip 12 in the diameter portion P0 of the throat of the circular arc-shaped tooth section 5 are equal. However, the invention is not limited thereto. The angles of torsion in an arbitrary position in the tooth depth direction and a corresponding position can be made equal (a position [first reference point 14] separated from a pitch circle Psa of the helical tooth section 4 by a predetermined distance [ε] in the tooth depth direction and a position [second reference point 15] separated from a pitch circle Psb in the diameter portion P0 of the throat of the circular arc-shaped tooth section 5 by the predetermined distance [ε] in the tooth depth direction, such as a position of the tooth bottom 8 of the helical tooth section 4 and a position of the tooth bottom 6 in the diameter portion P0 of the throat of the circular arc-shaped tooth section 5, or a position on the pitch circle Psa of the helical tooth section 4 and a position on the pitch circle Psb in the diameter portion P0 of the throat of the circular arc-shaped tooth section 5).

The shaft hole 2 is not limited to a circular hole such as that shown in FIG. 1 or FIG. 3. A serration, a spline, or the like that stops rotation with a shaft (not shown) can be formed. Alternatively, the hole can be polygonal.

(Method of Producing a Worm Wheel)

The worm wheel 1 according to the first embodiment shown in FIG. 1 to FIG. 3 is produced as described below.

(1) First Step in Worm Wheel Production

As a first step in worm wheel production, within production of an injection-molding die 17 for the worm wheel 1, when a cavity 18 in the injection-molding die 17 is formed by electrical discharge machining will be described (refer to FIG. 12).

Figure 4:
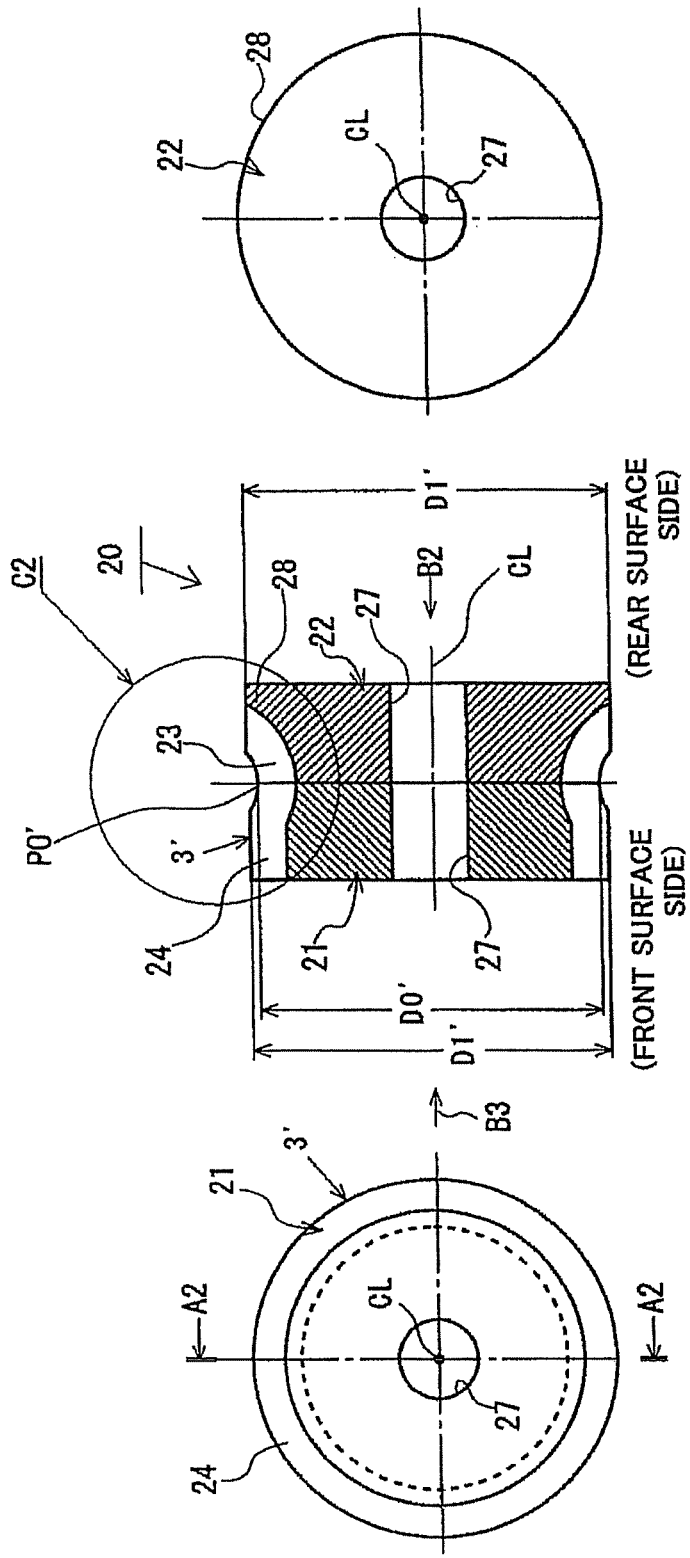
Figure 5:
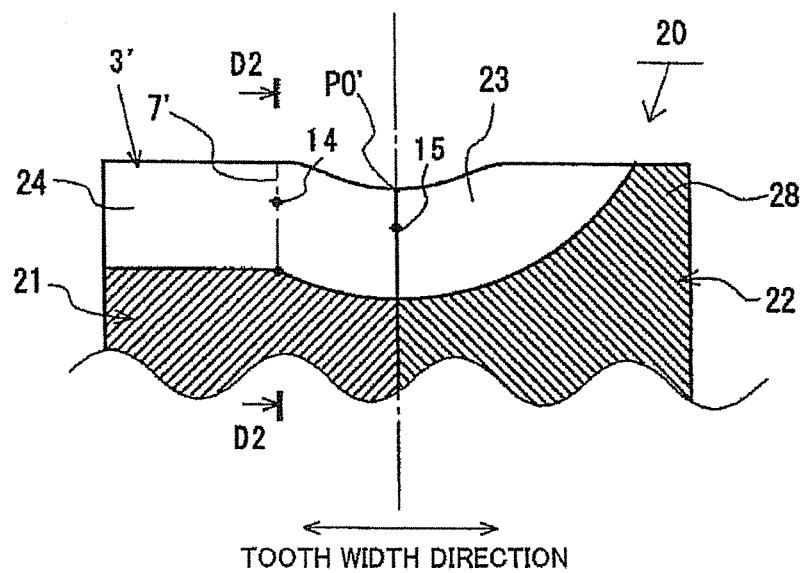
FIG. 5 is an enlarged view of section C2 in FIG. 4B.

To perform electrical discharge machining of the cavity 18 in the injection-molding die 17, a master electrode 20 for electrical discharge machining, such as that shown in FIG. 4 and FIG. 5, is required. The master electrode 20 serves to form the cavity 18 for injection-molding the worm wheel 1. Therefore, the overall shape is almost the same as that of the worm wheel 1 (see FIG. 12). The master electrode 20 is configured by a first divided master 21 and a second divided master 22. The first divided master 21 is used to form portions of the worm wheel 1 from the helical tooth section 4 to the diameter portion P0 of the throat of the circular arc-shaped tooth section 5. The second divided master 22 is used to form portions of the worm wheel 1 from the diameter portion P0 of the throat of the circular arc-shaped tooth section 5 to the flange section 13. In other words, as shown in FIG. 4B, the master electrode 20 is configured by the first divided master 21 for forming the left side of the worm wheel 1 from the diameter portion P0 of the throat of the circular arc-shaped tooth section 5 (see FIG. 1 and FIG. 2) and the second divided master 22 for forming the right side of the worm wheel 1 from the diameter portion P0 of the throat of the circular arc-shaped tooth section 5 (see FIG. 1 and FIG. 2). Here, the portion corresponding to the circular arc-shaped tooth section 5 of the worm wheel 1 is a first tooth section 23 in the master electrode 20. The portion corresponding to the helical tooth section 4 of the worm wheel 1 is a second tooth section 24 in the master electrode 20.

As shown in FIG. 6, the master electrode 20 such as that described above is formed by a first electrode material 25 (copper alloys, aluminum alloys, and the like in the shape of a hollow disk) corresponding to the first divided master 21, and a second electrode material 25 (copper alloys, aluminum alloys, and the like in the shape of a hollow disk) corresponding to the second divided master 22. According to the first embodiment, as shown in FIG. 6B, the first electrode material 25 and the second electrode material 26 are formed in a left-right symmetrical shape in relation to a position P0' corresponding to the diameter portion P0 of the throat of the worm wheel 1.

A shaft hole 27 of the same diameter is formed in both the first electrode material 25 and the second electrode material 26 shown in FIG. 6, to serve as a reference for machining. With the shaft hole 27 serving as the reference for machining, an outer shape is formed such as to have the same outer diameter dimension as the tooth tip diameter of the tooth 3' of the first tooth section 23 and the second tooth section 24. Then, gear cutting is performed in the first tooth section 23 and the second tooth section 24 (see FIG. 4 and FIG. 5). According to the first embodiment, the tooth tip diameter of the tooth 3' in the second tooth section 24 and the outer diameter dimension of a flange section 28 are equal (see FIG. 4 and FIG. 5).

Gear cutting of the tooth 3' in the first electrode material 25 and the second electrode material 26 is performed using a machining center by a ball end mill attached to a machining main shaft of the machining center. The machining center includes a computer in which a three-dimensional machining model (control data for gear cutting by a generating process based on gear specifications, such as module, pressure angle, throat diameter, and angle of torsion) of the master electrode 20, created in advance, is entered.

In gear cutting of the first electrode material 25, a cutting-lead (L1) of the tooth 3' in the first tooth section 23 and a cutting-lead (L2) of the tooth 3' in the second tooth section 24 are decided such that an angle of torsion $\beta 1$ of the tooth tip of the tooth 3' at the position P0' corresponding to the diameter portion of the throat of the first tooth section 23 and an angle of torsion $\beta 2$ of the tooth tip of the tooth 3' at a connecting section 7' between the first tooth section 23 and the second tooth section 24 (portion corresponding to the boundary between the circular arc-shaped tooth section 5 and the helical tooth section 4 of the worm wheel 1) are $\beta 1 = \beta 2$.

In other words, in the master electrode 20, when the tooth tip diameter of the tooth 3' at the position P0' corresponding to the diameter portion of the throat of the first tooth section 23 is a first diameter D0' and the tooth tip diameter of the tooth 3' at the connecting section 7' between the first tooth section 23 and the second tooth section 24 is a second diameter D1', $$L1 \cdot \tan \beta 1 = \pi \cdot D0' \quad \text{[Equation 1]}$$

$$L2 \cdot \tan \beta 2 = \pi \cdot D1' \quad \text{[Equation 2]}$$

Here, because $\beta 1 = \beta 2$, when the cutting-lead (L2) of the second tooth section 24 is determined from Equation 1 and Equation 2, $$L2 = (D1'/D0') \cdot L1 \quad \text{[Equation 3]}$$

In other words, the second tooth section 24 of the first electrode material 25 is cut with the lead L2 determined in Equation 3. Because D1'>D0', L2>L1.

In this way, as a result of the first tooth section 23 and the second tooth section 24 being cut into the first electrode material 25, the first divided master 21 of the master electrode 20 is formed. Gear cutting of the tooth 3' in the first tooth section 23 and the second tooth section 24 of the first electrode material 25 is performed by the ball end mill. Therefore, the tooth 3' in the first tooth section 23 and the tooth 3' in the second tooth section 24 are connected by a smooth curved surface without a step being formed in the connecting section 7' between the first tooth section 23 and the second tooth section 24.

Taking into consideration machining cost of electrical discharge machining and the like, the first diameter D0' is set to be slightly smaller than the diameter D0 of the throat of the worm wheel 1. Taking into consideration machining cost of electrical discharge machining and the like, the second diameter D1' is set to be slightly smaller than the tooth tip diameter D1 of the helical tooth section 4 of the worm wheel 1.

The second electrode material 26 is cut with the lead L1 such that the angle of torsion at the tooth tip of the tooth 3' in the first tooth section 23 at the position P0' corresponding to the diameter portion of the throat is $\beta 1$. The second divided master 22 of the master electrode 20 is formed.

Figure 7:
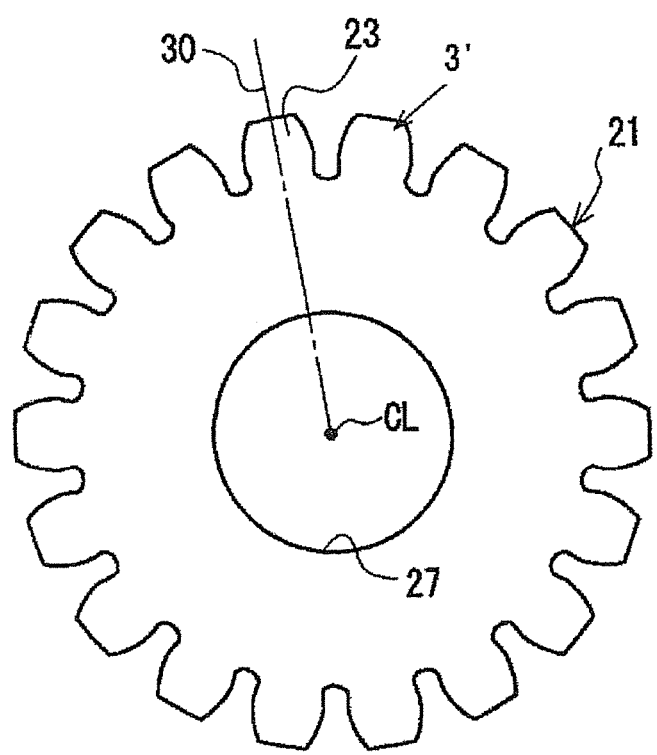
FIG. 7 is a rear view of the first divided master in FIG. 4.
Figure 8A:
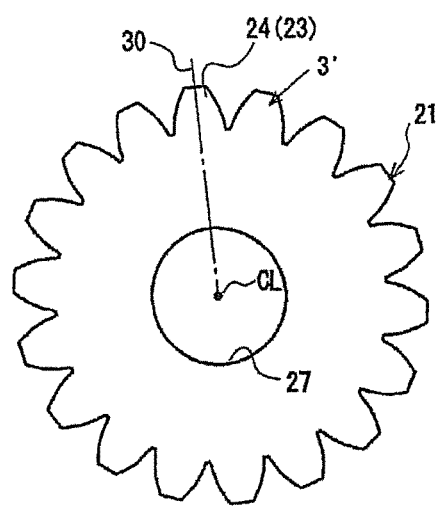
FIG. 8A is a cross-sectional view taken on a normal plane to an axis in a connecting section 7' between a first tooth section and a second tooth section of the first divided master in FIG. 4.
Figure 8B:
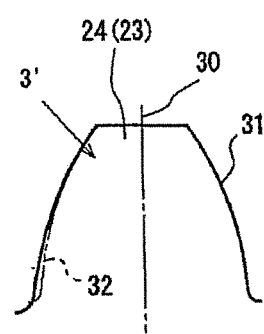
FIG. 8B is an enlarged view of a portion in FIG. 8A (cross-sectional view taken along line D2-D2 in FIG. 5)

Here, in the master electrode 20, the tooth 3' on the normal plane to the axis (rear surface side end surface of the first divided master 21) of the first tooth section 23 at the position P0' corresponding to the diameter portion of the throat is symmetrically shaped in relation to a tooth form center line 30 (see FIG. 7). On the other hand, in the master electrode 20, the first tooth section 23 and the second tooth section 24 are twisted such that the angle of torsion of the tooth tip of the first tooth section 23 at the position P0' corresponding to the diameter portion of the throat is $\beta 1$ and the angle of torsion of the tooth tip at the connecting section 7' between the first tooth section 23 and the second tooth section 24 is $\beta 1$. The first tooth section 23 is machined by a generating process. Therefore, the tooth form shape of the tooth 3' on the normal plane to the axis (cross-sectional view taken along line D2-D2 in FIG. 5) in the connecting section 7' between the first tooth section 23 and the second tooth section 24 is asymmetrical in relation to the tooth form center line 30 (see FIG. 8). In FIG. 8B, the tooth form shape indicated by a solid line is the tooth form shape of the actual tooth 3' after machining. The portion indicated by a dashed double-dotted line is a virtual side face (virtual tooth face) 32 at a position forming left-right symmetry with a side face (tooth face) on the right side in relation to the tooth form center line 30. The tooth form shape of the tooth 3' at the end face of the second tooth section 24 of the first divided master 21 (tooth form shape viewed from an arrow B3 direction in FIG. 4B) is similar to the tooth form shape of the tooth 3' on the normal plane to the axis (cross-sectional view taken along line D2-D2 in FIG. 5) in the connecting section 7' between the first tooth section 23 and the second tooth section 24, described above.

Figure 9:
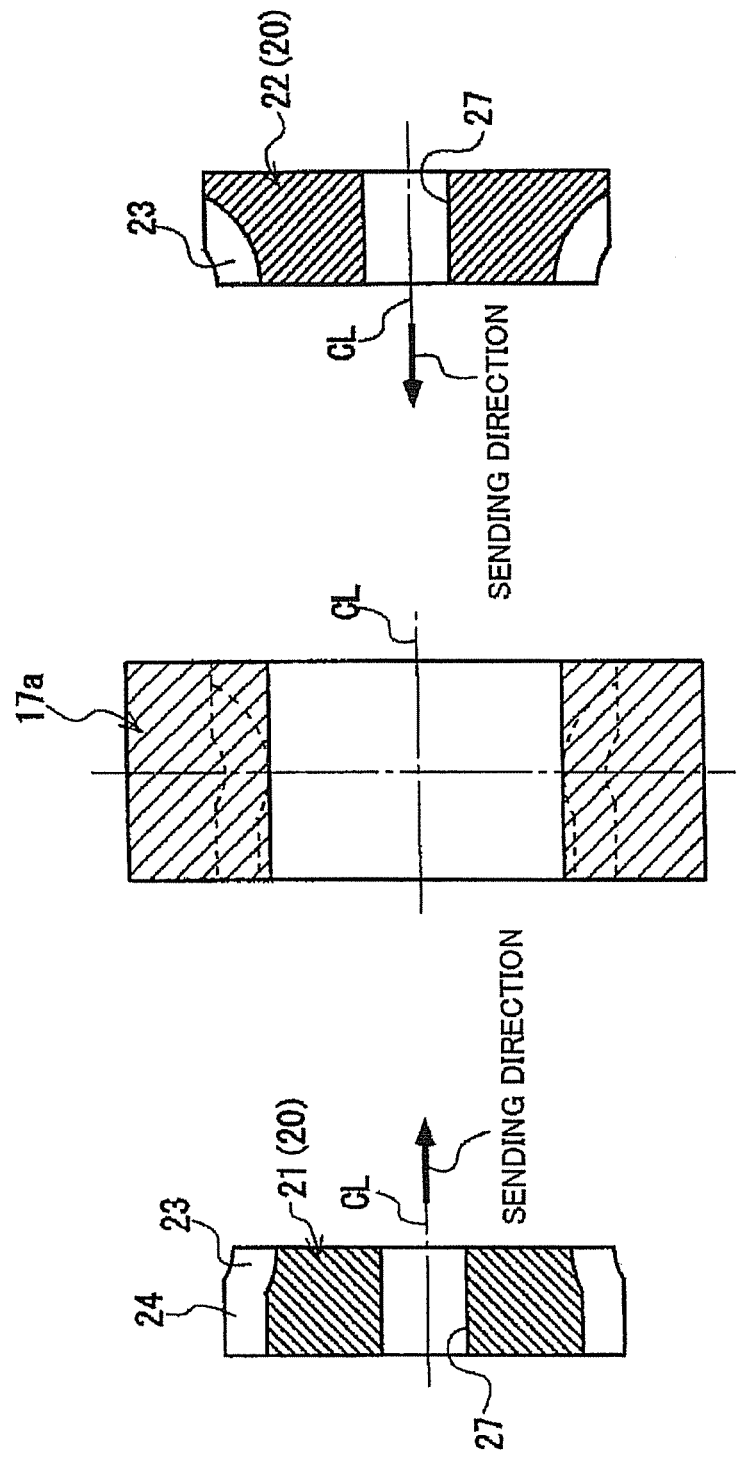
FIG. 9 is a diagram of a relationship between a die material for injection-molding die and the master electrode (first divided master and second divided master) according to the first embodiment of the present invention.
Figure 10:
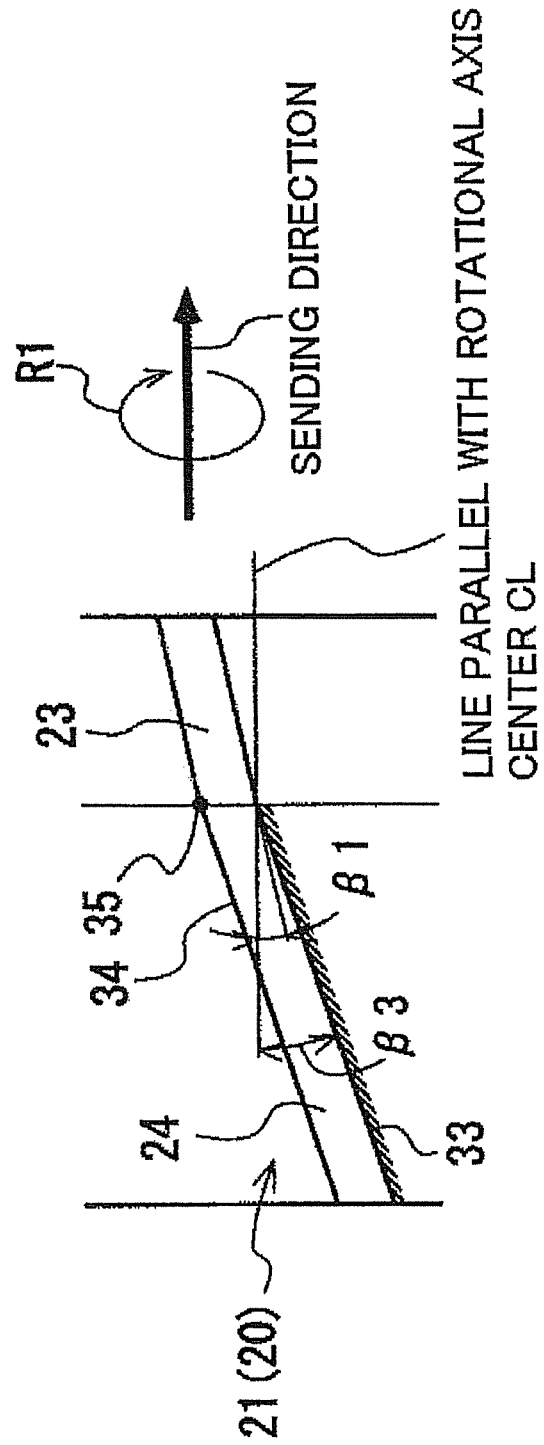
FIG. 10 is a schematic diagram of a moving direction of the first tooth section and the second tooth section of the first divided master during electrical discharge machining.
Figure 11:
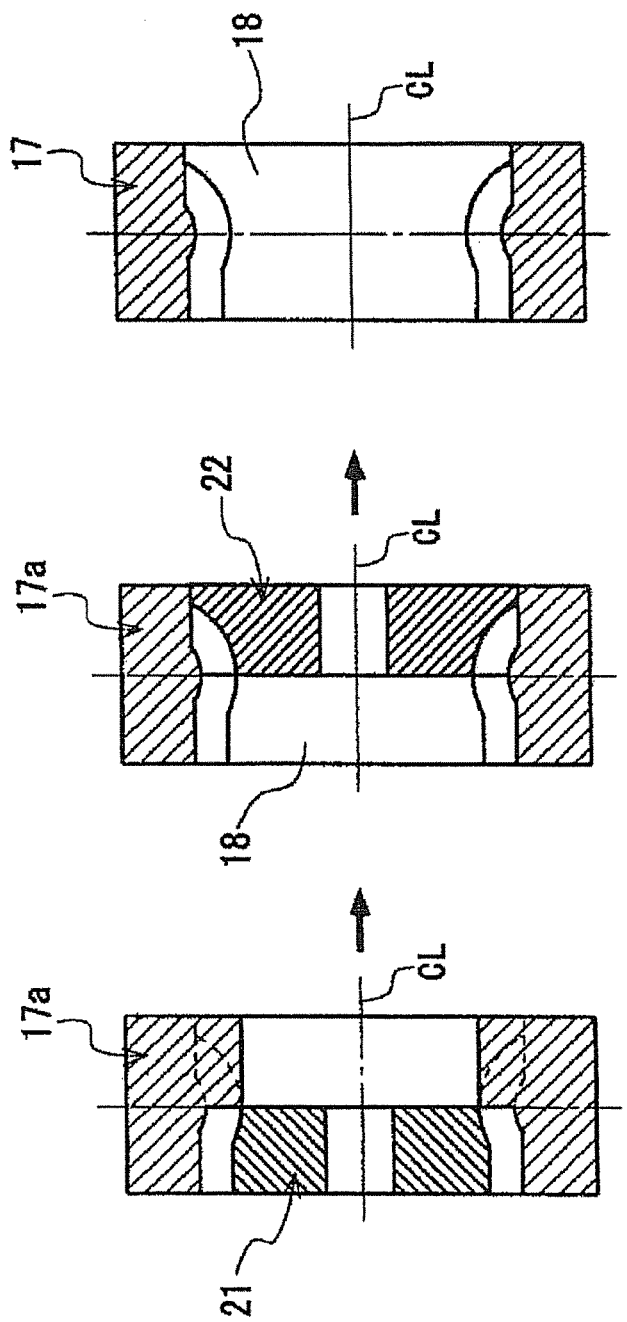
FIGS. 11A through 11C are diagrams of a processing step in electrical-discharge machining of the injection-molding die according to the first embodiment of the present invention.

FIG. 9 to FIG. 11 are schematic diagrams of a state in which the cavity 18 in the injection-molding die 17 is electrical-discharge-machined using the master electrode 20, described above. Among the drawings, FIG. 9 is a diagram of a relationship between a die material 17a before the cavity 18 is electrical-discharge-machined, and the first divided master and the second divided master. FIG. 10 is a schematic diagram of a moving direction of the first divided master during electrical-discharge machining of the first tooth section and the second tooth section. FIG. 11 is a diagram of a processing step during electrical discharge machining of the injection-molding die.

As shown in FIG. 9 and FIG. 11, the die material 17a is electrical-discharge-machined from one side (left side) in a direction along the rotational axis center CL by the first divided master 21 and is electrical-discharge-machined from the other side (right side) in the direction along the rotational axis center CL by the second divided master 22. As a result, the cavity 18 for injection-molding the worm wheel 1 is formed, and the injection-molding die 17 is formed.

Here, because the portion of the worm wheel 1 meshing with the worm 101 is the circular arc-shaped tooth section 5, the first divided master 21 is sent along the rotational axis center CL from the left side to the right side in FIG. 9 while being rotated, such that the lead is the same as the lead L1 of the first tooth section 23 corresponding to the circular arc-shape section 5.

In this way, when the cavity 18 of the injection-molding die 17 is electrical-discharge-machined using the first divided master 21, a portion excluding the connecting section 7' between the first tooth section 23 and the second tooth section 24 in the portion corresponding to the second tooth section 24 of the injection-molding die 17 is formed having an angle of torsion $\beta 3$ such as that expressed by the following equation (Equation 4).

$$\tan \beta 3 = (\pi \cdot D1')/L1 \quad \text{[Equation 4]}$$

Here, the portion of the cavity 18 corresponding to the connecting section 7' between the first tooth section 23 and the second tooth section 24 of the injection-molding die 17 is electrical-discharge-machined such that the shape of the connecting section 7' between the first tooth section 23 and the second tooth section 24 in the first divided master 21 is transferred. Therefore, the angle of torsion is β1.

The following equation (Equation 5) can be established from Equation 1 and Equation 4.

$$L1 = \frac{\pi \cdot D0'}{\tan\beta1} = \frac{\pi \cdot D1'}{\tan\beta3}$$ [Equation 5]

From Equation 5, tan β3 can be expressed by the following equation (Equation 6).

$$\tan\beta3 = (D1'/D0') \cdot \tan\beta1$$ [Equation 6]

In this equation (Equation 6), D1'>D0'. Therefore, β3 is greater than β1 (β3>β1).

During electrical discharge machining of the die material 17a using the first divided master 21, the lead L1 for electrical discharge machining in the first divided master 21 is smaller than the lead L2 of the second tooth section 24 (L1<L2). Therefore, as shown in FIG. 10, electrical discharge machining is performed in almost all of the area of one side face 33 (downstream-side side face of the first divided master 21 in the rotation direction indicated by an arrow R1) of the second tooth section 24. On the other hand, electrical discharge machining is performed only in the first tooth section side end section 35 of the other side face 34 (upstream-side side face of the first divided master 21 in the rotating direction indicated by the arrow R1) of the second tooth section 24. As a result, the tooth form shape of the portion forming the helical tooth section 4 in the cavity 18 of the injection-molding die 17 has greater asymmetry in relation to the tooth form center line 30, compared to the tooth form shape of the second tooth section 24 of the first divided master 21.

As described above, the cavity 18 of the portions corresponding to the circular arc-shaped tooth section 5 and the helical tooth section 4 on the left side of the diameter portion P0 of the throat of the worm wheel 1 is formed in the die material 17a by electrical discharge machining using the first divided master 21 (see FIG. 11A).

In addition, in the die material 17, the second divided master 22 is sent along the rotational axis center CL from the right side to the left side in FIG. 9 while being rotated, such that the lead is the same as the lead L1 for gear cutting of the first tooth section 23. As a result, the cavity 18 of the portions corresponding to the circular arc-shaped tooth section 5 and the flange section 13 on the right side of the diameter portion P0 of the throat of the circular arc-shaped tooth section 5 of the worm wheel 1 is formed in the die material 17a by electrical discharge machining (FIG. 11B). As a result, the overall cavity 18 for injection-molding the worm wheel 1 is formed in the die material 17a by electrical discharge machining, and the injection-molding die 17 is formed (see FIG. 11C).

The master electrode 20 according to the first embodiment is configured such that the angle of torsion of the tooth tip of the tooth 3' of the connecting section 7' between the first tooth 23 and the second tooth 24 and the angle of torsion of the tooth tip of the tooth 3' at the position P0' corresponding to the diameter portion of the throat of the first tooth section 23 are matched to be β1. However, the present invention is not limited thereto. The master electrode 20 can be configured such that the angle of torsion at an arbitrary position (first reference point 14) in the tooth depth direction of the tooth 3' in the connecting section 7' between the first tooth 23 and the second tooth 24 and the angle of torsion at the corresponding position (second reference point 15) in the tooth depth direction of the tooth 3' at the position P0' corresponding to the diameter portion of the throat of the first tooth section 23 are equal (see FIG. 4).

When electrical discharge machining is performed on the die material 17a using the master electrode 20, electrical discharge machining using the first divided master 21 can be performed after electrical discharge machining is first performed using the second divided master 22.

When electrical discharge machining is performed on the die material 17a using the master electrode 20, electrical discharge machining can be performed simultaneously using the first divided master 21 and the second divided master 22.

When electrical discharge machining is performed on the die material 17a using the master electrode 20, an example in which one of either the first divided master 21 or the second divided master 22 is used first, and an example in which the first divided master 21 and the second divided master 22 are simultaneously used can be considered. In both examples, the tooth 3' of the first divided master 21 and the tooth 3' of the second divided master 22 are positioned such that the portion corresponding to the diameter portion P0 of the throat of the circular arc-shaped tooth section 5 of the cavity 18 in the injection-molding die 17 is connected without misalignment in the peripheral direction (such that a step is not formed on the tooth face of the tooth 3 in FIG. 1 and FIG. 2).

(2) Second Step in Worm Wheel Production

Figure 12:
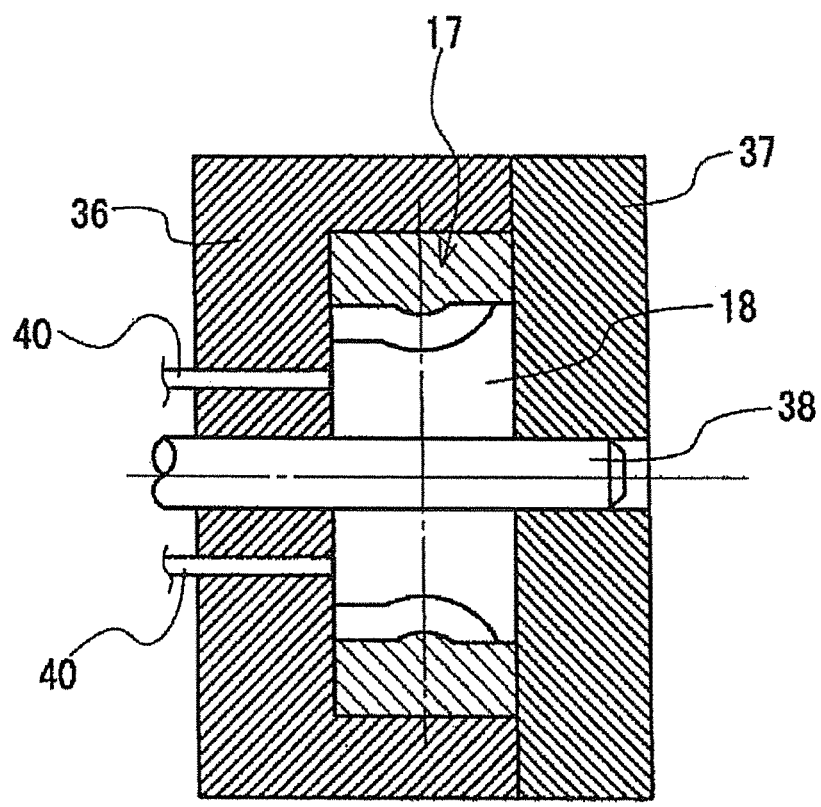
FIG. 12 is a diagram of a combined state of the injection-molding die and other die components (fixed die, movable die, shaft die, and the like) according to the first embodiment of the present invention.
Figure 13:
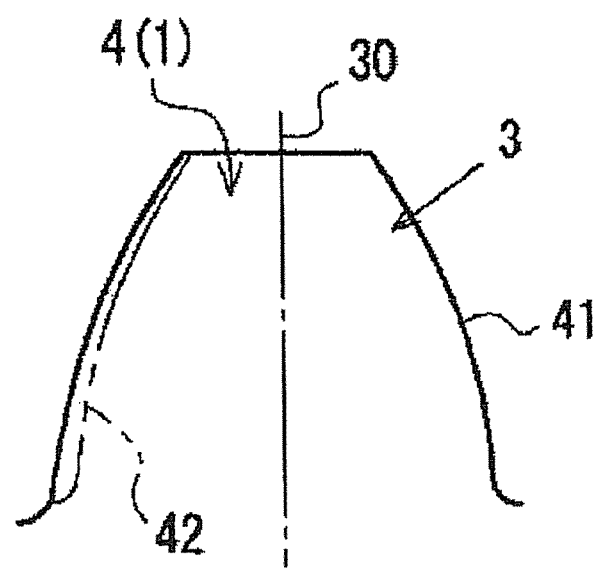
FIG. 13 is a tooth form diagram of a tooth cut along line D1-D1 in FIG. 2.

As shown in FIG. 12, the injection-molding die 17 formed as described above is combined with other die components (fixed die 36, movable die 37, shaft die 38, and the like). Molten resin is injected into the cavity 18. Then, after the resin within the cavity 18 has hardened (cooled) to a temperature allowing the resin to be pushed out, the movable die 37 is separated from the fixed die 36, opening one end side of the cavity 18 (side corresponding to the flange section 13 of the worm wheel 1). The product (worm wheel 1) within the cavity 18 is pushed out by an ejector pin 14 while being rotated with the same lead as the lead L1 of the circular arc-shaped tooth section 5. As a result, the worm wheel 1 in FIG. 1 to FIG. 3 is completed. The worm wheel 1 produced as described above has an outer shape that is a transfer of the shape of the cavity 18 of the injection-molding die 17. Therefore, the tooth form shape of the tooth on the normal plane to the axis (cross-section taken along line D1-D1 in FIG. 2) of the helical tooth section 4 is asymmetrical in relation to the tooth form center line 30. Compared to the tooth form shape of the tooth 3' of the second tooth section 24 of the master electrode 20, the tooth form shape of the tooth 3 is a further deformed involute tooth form (see FIG. 13). Here, in FIG. 13, the tooth form shape of the tooth 3 indicated by a solid line is the actual tooth form shape of the tooth 3 after injection molding. The portion indicated by a dashed double-dotted line is a virtual tooth face 42 symmetrical in the left-right direction with a tooth face 41 on the right side in relation to the tooth form center line 30. The tooth form shape of the tooth 3 of the helical tooth section 4 shown in FIG. 13 is similar to the tooth form shape of the tooth on the end face of the helical tooth section 4 viewed from the arrow B4 direction in FIG. 2.

(Variation Example of Injection-Molding Die Formation)

According to the first embodiment, an example is given in which the cavity 18 of the injection-molding die 17 is electrical-discharge-machined using the master electrode 20 configured by the first divided master 21 and the second divided master 22. However, the invention is not limited thereto. A master electrode 20 having a shape in which the first divided master 21 and the second divided master 22 are integrated can be used. The cavity 18 can be formed by electrocasting.

Because the cavity 18 of the injection-molding die 17 formed by electrocasting has a shape that is a direct transfer of the shape of the master electrode 20, the worm wheel 1 having the same shape as the master electrode 20 can be injection-molded.

(Another Variation Example of Injection-Molding Die Formation)

The cavity 18 of the injection-molding die 17 is not limited to being formed by electrical discharge machining or electrocasting using the master electrode 20 as described above. When cutting by a ball end mill attached to a machining center is possible, production of a master electrode can be omitted and the die material 17a can be cut by the ball end mill.

[Second Embodiment]

(Worm Wheel)

Figures 14A, 14B, 14C:
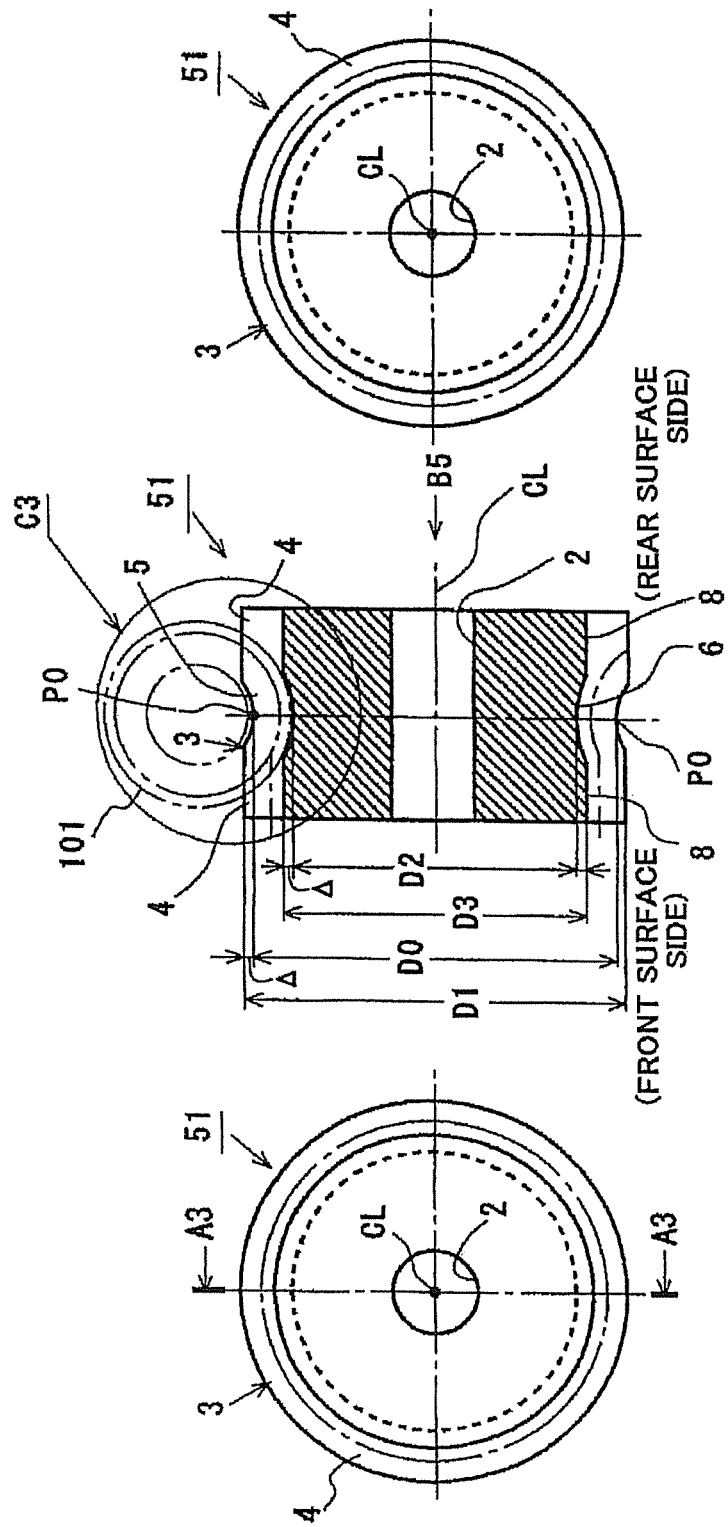
FIG. 14A is a front view.
FIG. 14B is a cross-sectional view taken along line A3-A3 in FIG. 14(a)
FIG. 14C is a diagram viewed from an arrow B5 direction in FIG. 14B (rear view)
Figure 15:
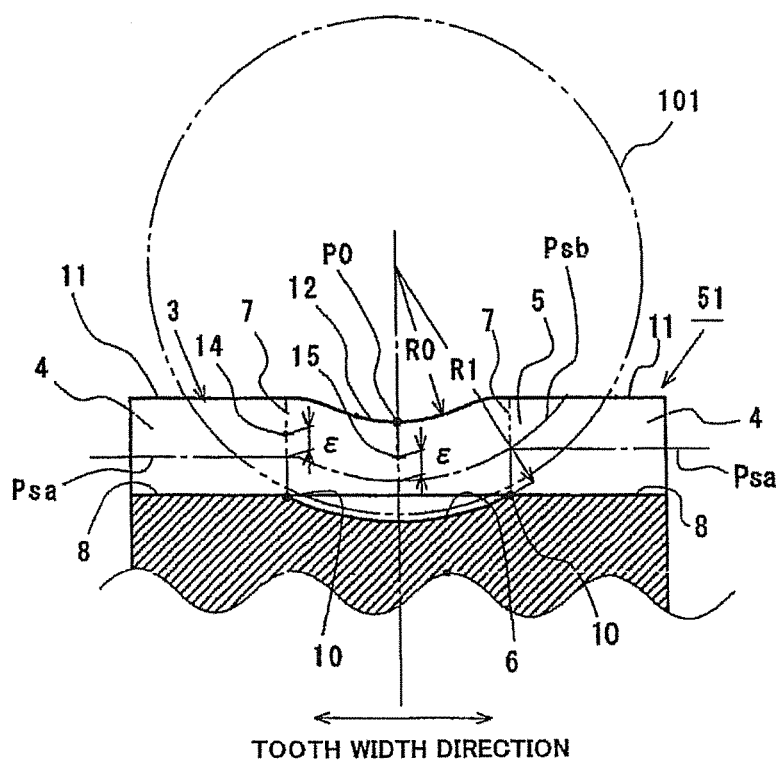
FIG. 15 is an enlarged view of section C3 in FIG. 14B.
Figure 16:
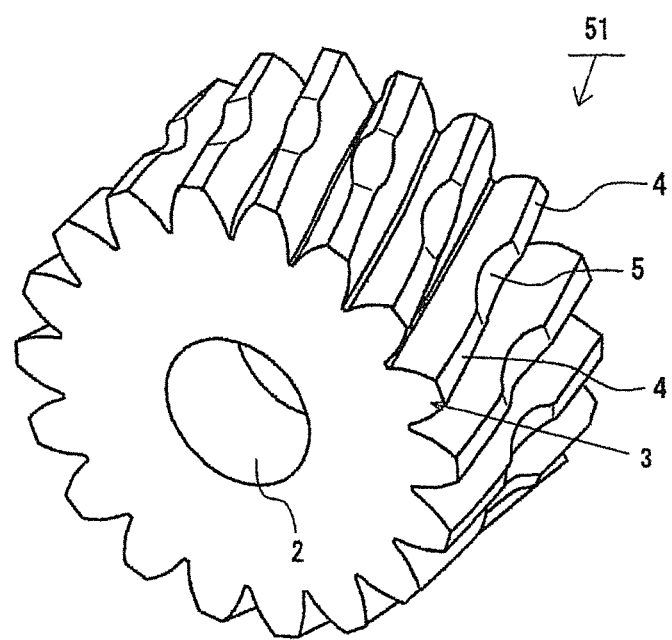
FIG. 16 is an outer perspective view of the worm wheel according to the second embodiment of the present invention.

FIG. 14 to FIG. 16 show a worm wheel 51 according to the second embodiment. As shown in the drawings, in the worm wheel 51 according to the second embodiment, a helical tooth section 4 similar to the helical tooth section 4 of the worm wheel 1 in FIG. 1 is formed on both sides of the circular arc-shaped tooth section 5. Aside from the configuration in which the flange section 13 of the worm wheel 1 in FIG. 1 is the helical tooth section 4, other configurations of the worm wheel 51 according to the second embodiment are the same as those of the worm wheel 1 in FIG. 1. Therefore, components that are the same as those in the worm wheel 1 in FIG. 1 are given the same reference numbers. Explanations overlapping with the explanation of the worm wheel 1 in FIG. 1 are omitted.

In the worm wheel 51 according to the second embodiment, a step is not formed in the boundary 7 between the helical tooth section 4 and the circular arc-shaped tooth section 5. The tooth face of the helical tooth section 4 and the tooth face of the circular arc-shaped tooth section 5 of the tooth 3 are smoothly connected with each other. Therefore, noise occurring when power transmission is performed by the worm wheel 51 and the worm 101 being meshed can be reduced.

(Method of Producing a Worm Wheel)

Figure 17:
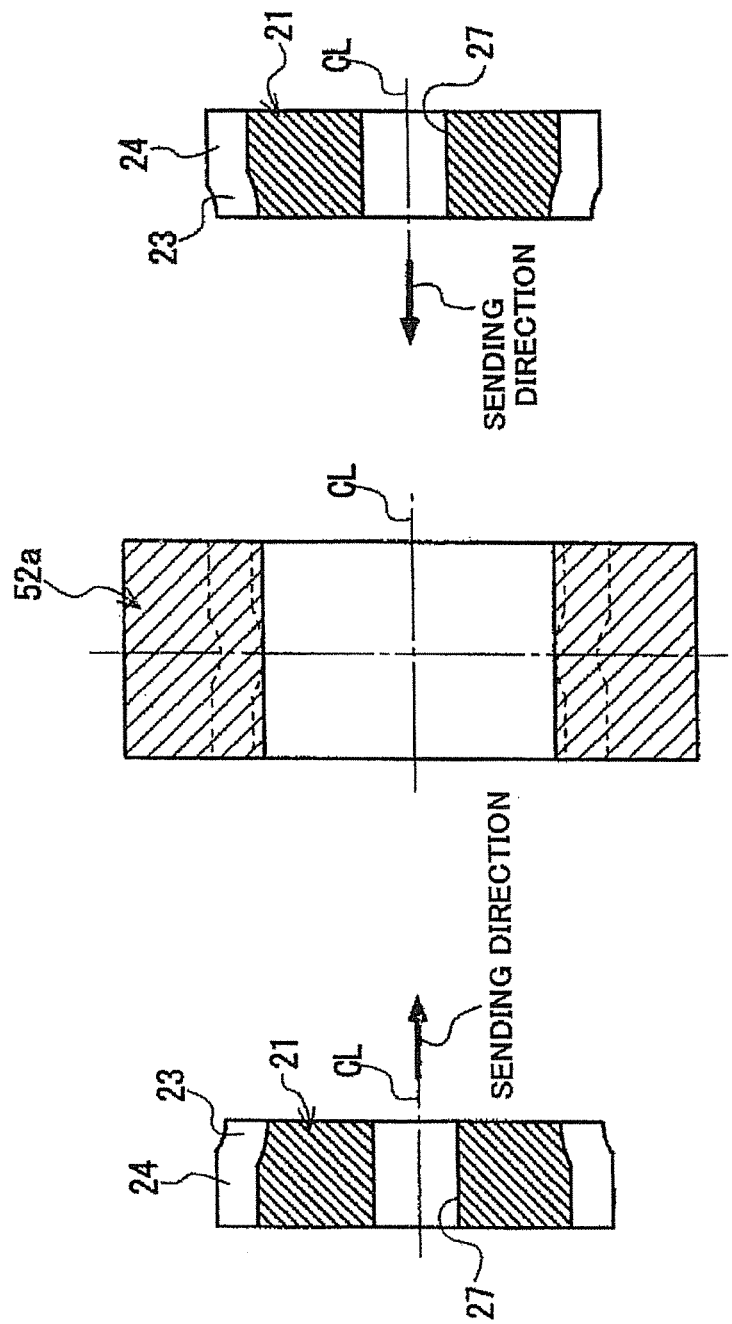
FIG. 17 is a diagram of a relationship between a die material for injection-molding die and a master electrode according to the second embodiment of the present invention.

A cavity 54 of an injection-molding die 53 used to form the worm wheel 51 in FIG. 14 to FIG. 16 is formed by electrical discharge machining of a die material 53a using the first divided master 21 (see FIG. 17 and FIG. 18). The first divided master 21 in FIG. 4 and FIG. 5 is used as the master electrode for electrical discharge machining (as a first divided master and a second divided master, the master electrode being divided at a position corresponding to the diameter portion of the throat).

Figure 18A:
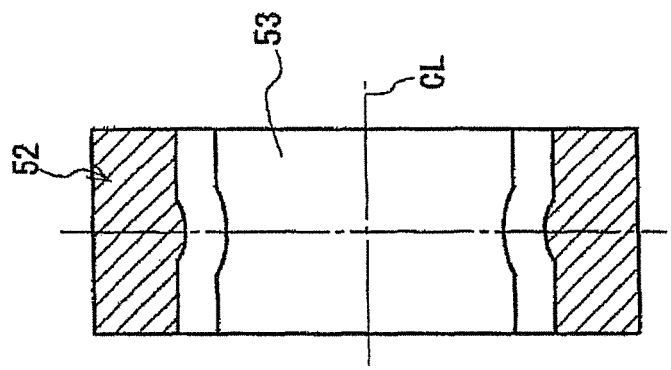
FIGS. 18A through 18C are diagrams of a processing step in electrical discharge machining of the injection-molding die according to the second embodiment of the present invention.

In other words, as shown in FIG. 17 and FIG. 18A, in the die material 52a, the first divided master 21 is sent along the rotation axis center CL while being rotated with the lead L1 from the left side to the right side. The cavity 53 corresponding to the left half of the worm wheel 51 from the diameter portion P0 of the throat is formed by electrical discharge machining.

Figure 18B:
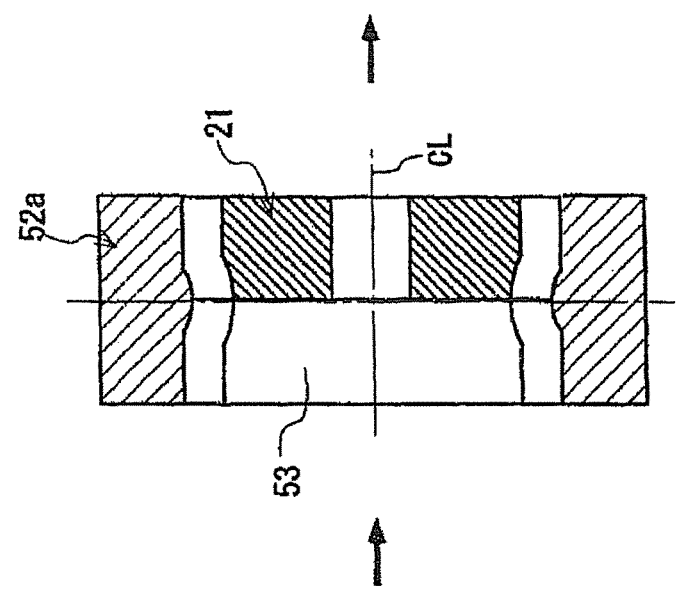

Then, as shown in FIG. 17 and FIG. 18B, in the die material 52a, the first divided master 21 is disposed such as to be reversed in the left-right direction, and sent along the rotational axis center CL while being rotated with the lead L from the right side to the left side. The cavity 53 corresponding to the right half of the worm wheel 51 from the diameter portion P0 of the throat is formed by electrical discharge machining.

Figure 18C:
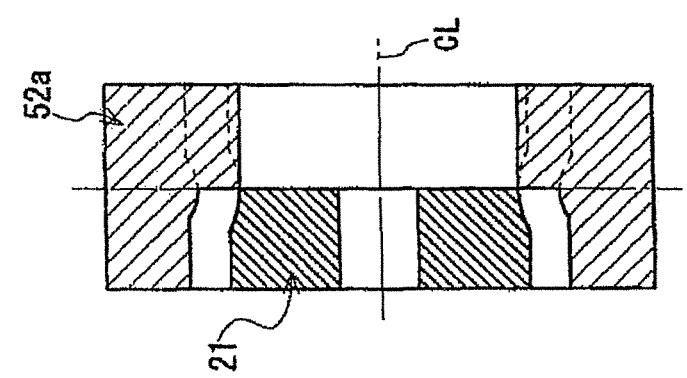

As a result, as shown in FIG. 18C, the injection-molding die 52 having the cavity 53 for injection molding the worm wheel 1 is completed.

In the die material 52a in FIG. 17, the left half in FIG. 17 can be electrical-discharge machined by the first divided master 21 after the right half in FIG. 17 is electrical-discharge machined by the first divided master 21. Alternatively, in the die material 52a in FIG. 17, the right half in FIG. 17 and the left half in FIG. 17 can be simultaneously electrical-discharge-machined by a pair of first divided masters 21 (first divided master 21 and second divided master 22).

Figure 19:
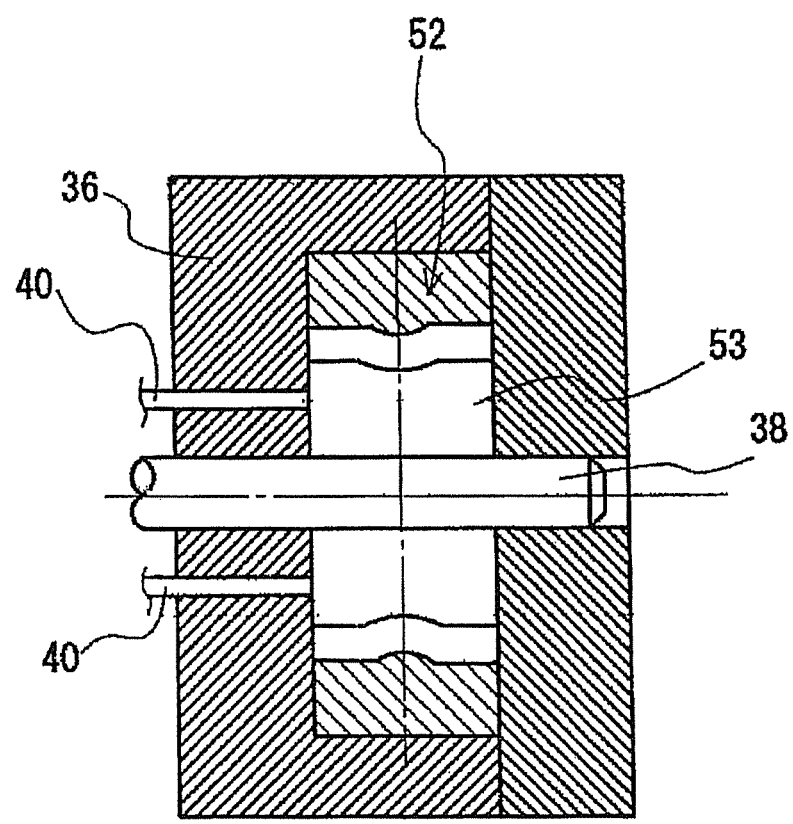
FIG. 19 is a diagram of a combined state of the injection-molding die and other die components (fixed die, movable die, shaft die, and the like) according to the second embodiment of the present invention.
Figure 20:
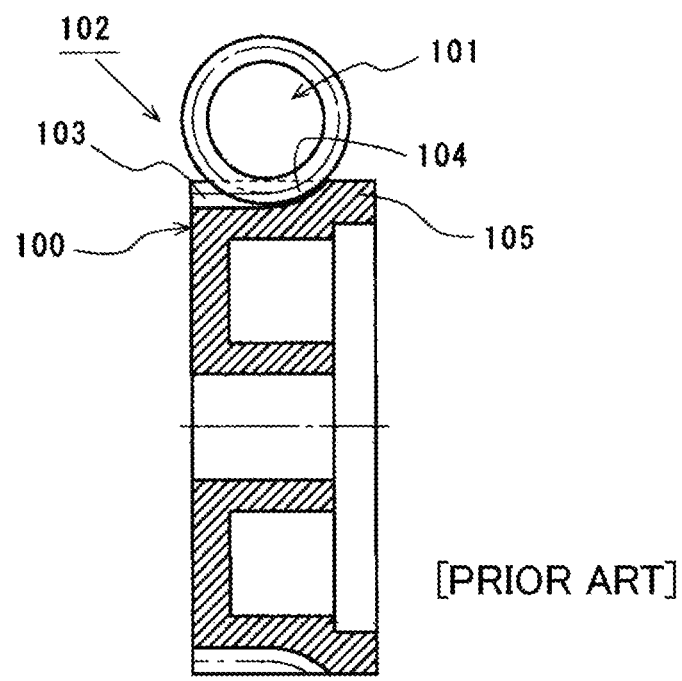
FIG. 20 is a vertical cross-sectional view of a worm wheel in a first conventional example.

As shown in FIG. 19, the injection-molding die 52 formed as described above is combined with other die components (fixed die 36, movable die 37, shaft die 38, and the like). Molten resin is injected into the cavity 53. Then, after the resin within the cavity 53 has hardened (cooled) to a temperature allowing the resin to be pushed out, the movable die 37 is separated form the fixed die 36, opening one end side of the cavity 53 (side corresponding to one helical tooth section 4 of the worm wheel 51). The product (worm wheel 51) within the cavity 53 is pushed out by an ejector pin 40 while being rotated with the same lead as the lead L1 of the circular arc-shaped tooth section 5. As a result, the worm wheel 51 in FIG. 14 to FIG. 16 is completed. The worm wheel 51 produced as described above has an outer shape that is a transfer of the shape of the cavity 53 of the injection-molding die 52. Therefore, the tooth form shape on the normal plane to the axis of the helical tooth section 4 is asymmetrical in relation to the tooth form center line 30, in a manner similar to that of the worm wheel 1 according to the first embodiment. The tooth form shape is a deformed involute tooth form (see FIG. 13).

When electrical discharge machining is performed on the die material 52a using the master electrode (first divided master 21), an example in which electrical discharge machining is performed from one of either the left side or the right side of the die material 52a, and an example in which electrical discharge machining is simultaneously performed from both the left side and the right side of the die material 52a can be considered. In both examples, the tooth 3' of the first divided master 21 and the tooth 3' of the first divided master 21 are positioned in relation to the die material 52a such that the portion corresponding to the diameter portion P0 of the throat of the circular arc-shaped tooth section 5 of the cavity 53 in the injection-molding die 52 is connected without misalignment in the peripheral direction (such that a step is not formed on the tooth face of the tooth 3 in FIG. 14 and FIG. 15).

In the worm wheel 51 shown in FIG. 14B, because the diameter portion P0 of the throat is positioned in the center in the tooth width direction, the first divided master 21 can also be used as the second divided master 22. However, when the diameter portion P0 of the throat is not positioned in the center in the tooth width direction, a first divided master for forming the left side portion from the diameter portion P0 of the throat of the worm wheel 51 and a second divided master (differing from the first divided master) for forming the right side portion from the diameter portion P0 of the throat of the worm wheel 51 are required to be prepared.

(Variation Example of Injection-Molding Die Formation)

According to the second embodiment, an example is given in which the cavity 53 of the injection-molding die 152 is electrical-discharge-machined by a master electrode, using the first divided master 21 according to the first embodiment as the master electrode. However, the invention is not limited thereto. A master electrode having a shape in which first divided masters 21 face each other and are integrated (a shape almost similar to the worm wheel 51) can be used. The cavity 53 can be formed by electrocasting.

Because the cavity 53 of the injection-molding die 52 formed by electrocasting has a shape that is a direct transfer of the shape of the master electrode, the worm wheel 51 having the same shape as the master electrode can be injection-molded.

(Another Variation Example of Injection-Molding Die Formation)

The cavity 53 of the injection-molding die 52 is not limited to being formed by electrical discharge machining or electrocasting using the master electrode such as those described above. When cutting by a ball end mill attached to a machining center is possible, the production of a master electrode can be omitted and the die material can be cut by the ball end mill.

The invention claimed is:

1. A method of producing an injection-molding die for a worm wheel in which a master electrode having a shape similar to the worm wheel is formed and a cavity for injection-molding the worm wheel is formed using the master electrode, wherein:

the worm wheel
  (1) has a circular arc-shaped tooth section that is a portion meshing with a worm and configuring a circular tube worm gear and a helical tooth section that is connected to one end side of the circular arc-shaped tooth section, and
  (2) has an angle of torsion at an arbitrary first reference point in a tooth depth direction of a tooth in a connecting section between the circular arc-shaped tooth section and the helical tooth section equal to an angle of torsion at a second reference point corresponding to the first reference point in the tooth depth direction of the tooth in a diameter portion of a throat of the circular arc-shaped tooth section; and the master electrode
  (1) has a first tooth section corresponding to the circular arc-shaped tooth section of the worm wheel and a second tooth section corresponding to the helical tooth section of the worm wheel,
  (2) has an angle of torsion at a position corresponding to the first reference point in the tooth depth direction of the tooth in a connecting section between the first tooth section and the second tooth section equal to an angle of torsion at a position corresponding to the first reference point in the tooth depth direction of the tooth at a position corresponding to the diameter portion of the throat of the first tooth section,
  (3) is divided at a position corresponding to the diameter portion of the throat of the first tooth section into a first divided master including a portion of the first tooth section and the second tooth section, and a second divided master including the other portion of the first tooth section, in which
  (4) the first divided master moves led by the first tooth section, while rotating with a lead of the first tooth section, and electrical-discharge-machines a die material from one side of the die material and
  (5) the second divided master moves led by the first tooth section, while rotating with a lead of the first tooth section, and electrical-discharge-machines a die material from the other side of the die material, and
  (6) forms the cavity in the die material.

2. A method of producing a worm wheel, wherein an injection-molding die for a worm wheel formed by a method of producing an injection-molding die for a worm wheel according to claim 1 is used to injection-mold a worm wheel, said worm wheel having a circular arc-shaped tooth section that is a portion meshing with a worm and configuring a circular tube worm gear and helical tooth sections that are respectively connected to one end side of the circular arc-shaped tooth section, and an angle of torsion of an arbitrary first reference point in a tooth depth direction of a tooth in a connecting section between the circular arc-shaped tooth section and the helical tooth section being equal to an angle of torsion of a second reference point corresponding to the first reference point in the tooth depth direction of the tooth in a diameter portion of a throat of the circular arc-shaped tooth section.

* * * * *